(12) United States Patent
Kimes et al.

(10) Patent No.: US 9,127,724 B2
(45) Date of Patent: Sep. 8, 2015

(54) ELECTROMECHANICAL APPARATUS FOR USE WITH A COUPLING ASSEMBLY AND CONTROLLABLE COUPLING ASSEMBLY INCLUDING SUCH APPARATUS

(71) Applicant: Means Industries, Inc., Saginaw, MI (US)

(72) Inventors: John W. Kimes, Wayne, MI (US); Terry O. Hendrick, Cass City, MI (US)

(73) Assignee: MEANS INDUSTRIES, INC., Saginaw, MI (US)

( * ) Notice: Subject to any disclaimer, the term of this patent is extended or adjusted under 35 U.S.C. 154(b) by 0 days.

(21) Appl. No.: 14/300,275

(22) Filed: Jun. 10, 2014

(65) Prior Publication Data

US 2014/0284167 A1 Sep. 25, 2014

Related U.S. Application Data

(63) Continuation-in-part of application No. 13/992,785, filed as application No. PCT/US2011/036634 on May 16, 2011.

(60) Provisional application No. 61/870,434, filed on Aug. 27, 2013, provisional application No. 61/941,741, filed on Feb. 19, 2014, provisional application No. 61/421,856, filed on Dec. 10, 2010.

(51) Int. Cl.
*F16D 11/00* (2006.01)
*F16D 27/09* (2006.01)

(52) U.S. Cl.
CPC ........................ *F16D 27/09* (2013.01)

(58) Field of Classification Search
CPC ............................... F16D 27/09; F16D 27/02
USPC ......... 192/46, 43.1, 35, 43.2, 41 R, 69, 84.92
See application file for complete search history.

(56) References Cited

U.S. PATENT DOCUMENTS 2,960,287 A 11/1960 Barlow
3,130,989 A 4/1964 Lannen
(Continued)

FOREIGN PATENT DOCUMENTS

GB 1007475 A 10/1965

OTHER PUBLICATIONS

International Search Report and Written Opinion; International application No. PCT/US2011/036634; date of mailing Aug. 25, 2011.
International Preliminary Report on Patentability; International application No. PCT/US2011/036634; date of issuance of report Jun. 12, 2013.
(Continued)

*Primary Examiner* — David J Hlavka
(74) *Attorney, Agent, or Firm* — Brooks Kushman P.C.

(57) ABSTRACT

Electromechanical apparatus for use with a coupling assembly and controllable coupling assembly including such apparatus are provided. The apparatus includes a housing part including an end wall having an outer coupling face with a single pocket defining a load-bearing shoulder in communication with an inner face of the end wall. An electromagnetic source includes at least one excitation coil which is at least partially surrounded by the housing part. An element is received within the pocket in an uncoupling position and is movable outwardly from the pocket to a coupling position characterized by abutting engagement of the element with the load-bearing shoulder. A reciprocating armature is arranged concentrically relative to the at least one excitation coil and is axially movable when the at least one excitation coil is supplied with current. The armature is connected to the element to move the element between the coupling and uncoupling positions.

31 Claims, 9 Drawing Sheets

(56) References Cited

U.S. PATENT DOCUMENTS

| | | | |
|---|---|---|---|
| 4,050,560 A * | 9/1977 | Torstenfelt | 192/85.02 |
| 4,200,002 A | 4/1980 | Takahashi | |
| 4,340,133 A | 7/1982 | Blersch | |
| 5,052,534 A | 10/1991 | Gustin et al. | |
| 5,070,978 A | 12/1991 | Pires | |
| 5,206,573 A | 4/1993 | McCleer et al. | |
| 5,231,265 A | 7/1993 | Hackett et al. | |
| 5,362,293 A | 11/1994 | Romanauskas | |
| 5,387,854 A | 2/1995 | McCleer et al. | |
| 5,394,321 A | 2/1995 | McCleer et al. | |
| 5,449,057 A | 9/1995 | Frank | |
| 5,453,598 A | 9/1995 | Hackett et al. | |
| 5,597,057 A | 1/1997 | Ruth et al. | |
| 5,638,929 A | 6/1997 | Park | |
| 5,642,009 A | 6/1997 | McCleer et al. | |
| 5,678,668 A | 10/1997 | Sink | |
| 5,806,643 A | 9/1998 | Fitz | |
| 5,847,469 A | 12/1998 | Tabata et al. | |
| 5,856,709 A | 1/1999 | Ibaraki et al. | |
| 5,871,071 A | 2/1999 | Sink | |
| 5,918,715 A | 7/1999 | Ruth et al. | |
| 5,927,455 A | 7/1999 | Baker et al. | |
| 5,954,174 A | 9/1999 | Costin | |
| 5,964,331 A | 10/1999 | Reed et al. | |
| 5,979,627 A | 11/1999 | Ruth et al. | |
| 6,019,699 A | 2/2000 | Hoshiya et al. | |
| 6,065,576 A | 5/2000 | Shaw et al. | |
| 6,075,302 A | 6/2000 | McCleer | |
| 6,116,394 A | 9/2000 | Ruth | |
| 6,125,980 A | 10/2000 | Ruth et al. | |
| 6,129,190 A | 10/2000 | Reed et al. | |
| 6,186,299 B1 | 2/2001 | Ruth | |
| 6,193,038 B1 | 2/2001 | Scott et al. | |
| 6,237,931 B1 | 5/2001 | Marola | |
| 6,244,965 B1 | 6/2001 | Klecker et al. | |
| 6,290,044 B1 | 9/2001 | Burgman et al. | |
| 6,306,057 B1 | 10/2001 | Morisawa et al. | |
| 6,344,008 B1 | 2/2002 | Nagano et al. | |
| 6,386,349 B1 | 5/2002 | Welch | |
| 6,481,551 B1 | 11/2002 | Ruth | |
| 6,503,167 B1 | 1/2003 | Sturm | |
| 6,505,721 B1 | 1/2003 | Welch | |
| 6,571,926 B2 | 6/2003 | Pawley | |
| 6,814,201 B2 | 11/2004 | Thomas | |
| 6,846,257 B2 | 1/2005 | Baker et al. | |
| 6,854,577 B2 | 2/2005 | Ruth | |
| 6,953,409 B2 | 10/2005 | Schmidt et al. | |
| 6,982,502 B1 | 1/2006 | Sendaula et al. | |
| 7,025,188 B2 | 4/2006 | Lindenschmidt et al. | |
| 7,093,512 B2 | 8/2006 | Ibamoto et al. | |
| 7,100,756 B2 | 9/2006 | Kimes et al. | |
| 7,153,228 B2 | 12/2006 | Fujiu et al. | |
| 7,198,587 B2 | 4/2007 | Samie et al. | |
| 7,201,690 B2 | 4/2007 | Miura et al. | |
| 7,223,198 B2 | 5/2007 | Kimes et al. | |
| 7,223,200 B2 | 5/2007 | Kojima et al. | |
| 7,255,186 B2 | 8/2007 | Wakuta et al. | |
| 7,256,510 B2 | 8/2007 | Holmes et al. | |
| 7,258,214 B2 | 8/2007 | Pawley et al. | |
| 7,275,628 B2 | 10/2007 | Pawley et al. | |
| 7,344,010 B2 | 3/2008 | Fetting, Jr. et al. | |
| 7,349,010 B2 | 3/2008 | Bryant et al. | |
| 7,383,930 B2 | 6/2008 | Kimes et al. | |
| 7,393,296 B2 | 7/2008 | Kano et al. | |
| 7,397,296 B1 | 7/2008 | Kiani | |
| 7,426,971 B2 | 9/2008 | Kano et al. | |
| 7,448,481 B2 | 11/2008 | Kimes et al. | |
| 7,451,862 B2 | 11/2008 | Kimes et al. | |
| 7,455,156 B2 | 11/2008 | Kimes et al. | |
| 7,455,157 B2 | 11/2008 | Kimes et al. | |
| 7,464,801 B2 | 12/2008 | Wittkopp | |
| 7,484,605 B2 | 2/2009 | Pawley et al. | |
| 7,491,151 B2 | 2/2009 | Maguire et al. | |
| 7,614,466 B2 | 11/2009 | Kano et al. | |
| 7,621,359 B2 | 11/2009 | Kano et al. | |
| 7,661,518 B2 | 2/2010 | Kimes | |
| 7,690,455 B2 | 4/2010 | Kano et al. | |
| 7,690,492 B2 | 4/2010 | Gooden et al. | |
| 7,806,795 B2 | 10/2010 | Oba et al. | |
| 7,942,781 B2 | 5/2011 | Kimes | |
| 8,007,396 B2 | 8/2011 | Kimes et al. | |
| 8,051,959 B2 | 11/2011 | Eisengruber | |
| 8,061,496 B2 * | 11/2011 | Samie et al. | 192/43 |
| 8,079,453 B2 | 12/2011 | Kimes | |
| 8,187,141 B2 | 5/2012 | Goleski et al. | |
| 8,196,724 B2 * | 6/2012 | Samie et al. | 192/43.1 |
| 8,272,488 B2 | 9/2012 | Eisengruber et al. | |
| 8,286,772 B2 | 10/2012 | Eisengruber | |
| 8,324,890 B2 | 12/2012 | Lin | |
| 8,491,439 B2 | 7/2013 | Kimes | |
| 8,491,440 B2 | 7/2013 | Kimes et al. | |
| 8,720,659 B2 * | 5/2014 | Pawley | 192/46 |
| 2002/0000724 A1 | 1/2002 | Kalargeros et al. | |
| 2004/0159517 A1 * | 8/2004 | Thomas | 192/39 |
| 2006/0021838 A1 | 2/2006 | Kimes et al. | |
| 2006/0138777 A1 | 6/2006 | Hofbauer et al. | |
| 2006/0185957 A1 * | 8/2006 | Kimes et al. | 192/46 |
| 2007/0056825 A1 | 3/2007 | Fetting, Jr. et al. | |
| 2007/0107960 A1 | 5/2007 | Takami et al. | |
| 2007/0278061 A1 | 12/2007 | Wittkopp et al. | |
| 2008/0093190 A1 | 4/2008 | Belmont | |
| 2008/0110715 A1 | 5/2008 | Pawley | |
| 2008/0135369 A1 | 6/2008 | Meier | |
| 2008/0169165 A1 | 7/2008 | Samie et al. | |
| 2008/0169166 A1 | 7/2008 | Wittkopp et al. | |
| 2008/0185253 A1 | 8/2008 | Kimes | |
| 2008/0188338 A1 | 8/2008 | Kimes et al. | |
| 2008/0223681 A1 | 9/2008 | Stevenson et al. | |
| 2008/0245360 A1 | 10/2008 | Almy et al. | |
| 2009/0062058 A1 | 3/2009 | Kimes et al. | |
| 2009/0084653 A1 | 4/2009 | Holmes | |
| 2009/0098970 A1 | 4/2009 | Kimes | |
| 2009/0127059 A1 | 5/2009 | Knoblauch | |
| 2009/0133981 A1 | 5/2009 | Tarasinski et al. | |
| 2009/0142207 A1 | 6/2009 | Ring et al. | |
| 2009/0159391 A1 | 6/2009 | Eisengruber | |
| 2009/0194381 A1 | 8/2009 | Samie et al. | |
| 2009/0211863 A1 | 8/2009 | Kimes | |
| 2009/0233755 A1 | 9/2009 | Kimes | |
| 2009/0255773 A1 | 10/2009 | Seufert et al. | |
| 2010/0071497 A1 | 3/2010 | Reisch et al. | |
| 2010/0105515 A1 | 4/2010 | Goleski et al. | |
| 2010/0127693 A1 | 5/2010 | Wenzel et al. | |
| 2010/0200358 A1 | 8/2010 | Eisengruber et al. | |
| 2010/0230226 A1 | 9/2010 | Prout | |
| 2010/0252384 A1 | 10/2010 | Eisengruber | |
| 2012/0021862 A1 | 1/2012 | Isken, II et al. | |
| 2012/0145505 A1 | 6/2012 | Kimes | |
| 2012/0149518 A1 | 6/2012 | Kimes | |
| 2012/0152683 A1 | 6/2012 | Kimes | |
| 2012/0152687 A1 | 6/2012 | Kimes et al. | |
| 2012/0228076 A1 | 9/2012 | Tate, Jr. et al. | |
| 2013/0062151 A1 | 3/2013 | Pawley | |
| 2014/0102844 A1 | 4/2014 | Greene et al. | |
| 2014/0190785 A1 | 7/2014 | Fetting et al. | |
| 2014/0284167 A1 | 9/2014 | Kimes | |

OTHER PUBLICATIONS

International Search Report and Written Opinion; International application No. PCT/US12/050742; date of mailing Nov. 20, 2012.
Official Action, corresponding U.S. Appl. No. 13/992,785; filed Jun. 10, 2013.
International Search Report and Written opinion; International application No. PCT/US2014/041631; Date of mailing Oct. 9, 2014.
Notice of Allowance and Issue Fees Due; corresponding U.S. Appl. No. 13/992,785; date of mailing Jan. 30, 2015.
International Search Report and Written Opinion; International application No. PCT/US2014/049044; date of mailing Nov. 24, 2014.
Office Action, corresponding U.S. Appl. No. 14/288,819; date of mailing Jan. 12, 2015.

* cited by examiner

ELECTROMECHANICAL APPARATUS FOR USE WITH A COUPLING ASSEMBLY AND CONTROLLABLE COUPLING ASSEMBLY INCLUDING SUCH APPARATUS

CROSS REFERENCE TO RELATED APPLICATION

This application claims the benefit of provisional patent applications Ser. No. 61/870,434 filed Aug. 27, 2013 and Ser. No. 61/941,741 filed Feb. 19, 2014. This application is a continuation-in-part of U.S. patent application Ser. No. 13/992,785 filed Jun. 10, 2013 which is a 371 of PCT/US2011/036634 filed May 16, 2011 which, in turn, claims the benefit of provisional patent application Ser. No. 61/421,856 filed Dec. 10, 2010.

TECHNICAL FIELD

This invention generally relates to electromechanical apparatus for use with coupling assemblies to obtain controllable or selectable one-way clutch assemblies which include such apparatus.

OVERVIEW

Coupling assemblies such as clutches are used in a wide variety of applications to selectively couple power from a first rotatable driving member, such as a driving disk or plate, to a second, independently rotatable driven member, such as a driven disk or plate. In one known variety of clutches, commonly referred to as "one-way" or "overrunning" clutches, the clutch engages to mechanically couple the driving member to the driven member only when the driving member rotates in a first direction relative to the driven member. Once so engaged, the clutch will release or decouple the driven member from the driving member only when the driving member rotates in a second, opposite direction relative to the driven member. Further, the clutch otherwise permits the driving member to freely rotate in the second direction relative to the driven member. Such "freewheeling" of the driving member in the second direction relative to the driven member is also known as the "overrunning" condition.

One type of one-way clutch includes coaxial driving and driven plates having generally planar clutch faces in closely spaced, juxtaposed relationship. A plurality of recesses or pockets is formed in the face of the driving plate at angularly spaced locations about the axis, and a strut or pawl is disposed in each of the pockets. Multiple recesses or notches are formed in the face of the driven plate and are engageable with one or more of the struts when the driving plate is rotating in a first direction. When the driving plate rotates in a second direction opposite the first direction, the struts disengage the notches, thereby allowing freewheeling motion of the driving plate with respect to the driven plate.

When the driving plate reverses direction from the second direction to the first direction, the driving plate typically rotates relative to the driven plate until the clutch engages. As the amount of relative rotation increases, the potential for an engagement noise also increases.

Controllable or selectable one-way clutches (i.e., OWCs) are a departure from traditional one-way clutch designs. Selectable OWCs add a second set of locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or control mechanism. Movement of this selection mechanism can be between two or more positions which correspond to different operating modes.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission.

U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

In a powershift transmission, tip-in clunk is one of most difficult challenges due to absence of a torque converter. When the driver tips-in, i.e., depresses the accelerator pedal following a coast condition, gear shift harshness and noise, called clunk, are heard and felt in the passenger compartment due to the mechanical linkage, without a fluid coupling, between the engine and powershift transmission input. Tip-in clunk is especially acute in a parking-lot maneuver, in which a vehicle coasting at low speed is then accelerated in order to maneuver into a parking space.

In order to achieve good shift quality and to eliminate tip-in clunk, a powershift transmission should employ a control strategy that is different from that of a conventional automatic transmission. The control system should address the unique operating characteristics of a powershift transmission and include remedial steps to avoid the objectionable harshness yet not interfere with driver expectations and performance requirements of the powershift transmission. There is a need to eliminate shift harshness and noise associated with tip-in clunk in a powershift transmission.

For purposes of this disclosure, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

A pocket plate may be provided with angularly disposed recesses or pockets about the axis of the one-way clutch. The pockets are formed in the planar surface of the pocket plate. Each pocket receives a torque transmitting strut, one end of which engages an anchor point in a pocket of the pocket plate. An opposite edge of the strut, which may hereafter be referred to as an active edge, is movable from a position within the pocket to a position in which the active edge extends outwardly from the planar surface of the pocket plate. The struts may be biased away from the pocket plate by individual springs.

A notch plate may be formed with a plurality of recesses or notches located approximately on the radius of the pockets of the pocket plate. The notches are formed in the planar surface of the notch plate.

Another example of an overrunning planar clutch is disclosed in U.S. Pat. No. 5,597,057.

Some U.S. patents related to the present invention include: U.S. Pat. Nos. 5,052,534; 5,070,978; 5,449,057; 5,678,668; 5,806,643; 5,871,071; 5,918,715; 5,964,331; 5,979,627;

6,065,576; 6,116,394; 6,125,980; 6,129,190; 6,186,299; 6,193,038; 6,386,349; 6,481,551; 6,505,721; 6,571,926; 6,814,201; 7,153,228; 7,275,628; 8,051,959; 8,196,724; and 8,286,772.

Yet still other related U.S. patents include: U.S. Pat. Nos. 4,200,002; 5,954,174; and 7,025,188.

U.S. Pat. No. 6,854,577 discloses a sound-dampened, one-way clutch including a plastic/steel pair of struts to dampen engagement clunk. The plastic strut is slightly longer than the steel strut. This pattern can be doubled to dual engaging. This approach has had some success. However, the dampening function stopped when the plastic parts became exposed to hot oil over a period of time.

Metal injection molding (MIM) is a metalworking process where finely-powdered metal is mixed with a measured amount of binder material to comprise a 'feedstock' capable of being handled by plastic processing equipment through a process known as injection mold forming. The molding process allows complex parts to be shaped in a single operation and in high volume. End products are commonly component items used in various industries and applications. The nature of MIM feedstock flow is defined by a physics called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

Other U.S. patent documents related to at least one aspect of the present invention includes U.S. Pat. Nos. 8,491,440; 8,491,439; 8,272,488; 8,187,141; 8,079,453; 8,007,396; 7,942,781; 7,690,492; 7,661,518; 7,455,157; 7,455,156; 7,451,862; 7,448,481; 7,383,930; 7,223,198; 7,100,756; and 6,290,044; and U.S. published application Nos. 2013/0062151; 2012/0152683; 2012/0149518; 2012/0152687; 2012/0145505; 2011/0233026; 2010/0105515; 2010/0230226; 2009/0233755; 2009/0062058; 2008/0110715; 2008/0188338; 2008/0185253; 2006/0185957; and 2006/0021838.

SUMMARY OF EXAMPLE EMBODIMENTS

An object of at least one embodiment of the present invention is to provide an electromechanical apparatus for use with a coupling assembly to obtain a controllable coupling assembly wherein the resulting assembly has no need for a pocket plate or a slide plate for that matter.

In carrying out the above object and other objects of at least one embodiment of the present invention, an electromechanical apparatus for use in a controllable coupling assembly is provided. The apparatus includes a housing part having a closed axial end and including an end wall having an outer coupling face with a single pocket defining a load-bearing shoulder in communication with an inner face of the end wall. An electromagnetic source includes at least one excitation coil which is at least partially surrounded by the housing part. An element is received within the pocket in an uncoupling position and is movable outwardly from the pocket to a coupling position characterized by abutting engagement of the element with the load-bearing shoulder. A reciprocating armature is arranged concentrically relative to the at least one excitation coil and is axially movable when the at least one excitation coil is supplied with current. The armature is connected to the element to move the element between the coupling and uncoupling positions.

The element may be a locking element which controls the operating mode of the coupling assembly.

The element may be an impact energy storage element to absorb and store impact energy to reduce undesirable noise and contact stress caused by a transition between operating modes of the coupling assembly.

The element may be pivotally connected to a leading end of the armature wherein the armature may pivotally move the element within the pocket in response to reciprocating movement of the armature.

The at least one coil, the housing part and the armature may comprise a low profile solenoid.

The locking element may be an injection molded strut.

The storage element may include a rigid insert and an elastomeric outer covering layer surrounding and bonded to the insert.

The outer covering layer may be a high temperature-resistant layer molded over the insert.

The storage element may carry elastomeric material defining opposite end sections of the storage element. One of the end sections may be configured to deflect upon abutting engagement with the shoulder.

The apparatus may include at least one return biasing member to urge the armature to a return position which corresponds to the uncoupling position of the element.

The housing part may have at least one attachment flange to attach the apparatus to a coupling member of the coupling assembly.

The outer coupling face of the end wall may be oriented to face axially.

The pocket may have a T-shape.

The element may include at least one projecting leg portion which provides an attachment location for a leading end of the armature. Each leg portion may have an aperture wherein the apparatus may further include a pivot pin received within each aperture to allow rotational movement of the element in response to reciprocating movement of the armature. The leading end of the armature may be connected to the element via the pivot pin.

Each aperture may be an oblong aperture to receive the pivot pin to allow both rotation and translational movement of the element in response to reciprocating movement of the armature.

Further in carrying out the above object and other objects of at least one embodiment of the present invention, a controllable coupling assembly having multiple operating modes is provided. The assembly includes first and second coupling members supported for rotation relative to one another about a common rotational axis. The first coupling member has a first coupling face with a plurality of recesses. Each of the recesses defines a load-bearing first shoulder. An electromechanical apparatus is attached to the second coupling member and includes a housing part having a closed axial end including an end wall having an outer coupling face in close-spaced opposition to the first coupling face and having a single pocket defining a load-bearing second shoulder in communication with an inner face of the end wall. An electromagnetic source including at least one excitation coil is at least partially surrounded by the housing part. An element is received within the pocket in an uncoupling position and is movable outwardly from the pocket to a coupling position to couple the coupling members together. The coupling position is characterized by abutting engagement of the element with respective shoulders of the first member and the end wall. A reciprocating armature is arranged concentrically relative to the at least one excitation coil and is axially movable when the at least one excitation coil is supplied with current. The armature is connected to the element to move the element between the coupling and uncoupling positions.

The element may be a locking element or the element may be an impact energy storage element to absorb and store impact energy.

The element may be pivotally connected to a leading end of the armature wherein the armature pivotally moves the element within the pocket in response to reciprocating movement of the armature.

The locking element may be an injection molded strut.

The storage element may include a rigid insert and an elastomeric outer covering layer surrounding and bonded to the insert.

The outer covering layer may be a high temperature-resistant layer molded over the insert.

The storage element may carry elastomeric material defining opposite end sections of the storage element. Each end section is configured to deflect upon abutting engagement with respective shoulders of the first coupling member and the end wall.

The at least one coil, the housing part and the armature may comprise a low profile solenoid.

The assembly may further include at least one return biasing member to urge the armature to a return position which corresponds to the uncoupling position of the element.

The housing part may have at least one attachment flange to attach the apparatus to the second coupling member.

The outer coupling face of the end wall may be oriented to face axially.

The pocket may have a T-shape.

The element may include at least one projecting leg portion which provides an attachment location for a leading end of the armature.

Each leg portion may have an aperture wherein the apparatus may further includes a pivot pin received within each aperture to allow rotational movement of the element in the pocket in response to reciprocating movement of the armature and wherein the leading end of the armature may be connected to the element via the pivot pin.

Each aperture may be an oblong aperture to receive the pivot pin to allow both rotation and translational movement of the element in response to reciprocating movement of the armature.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
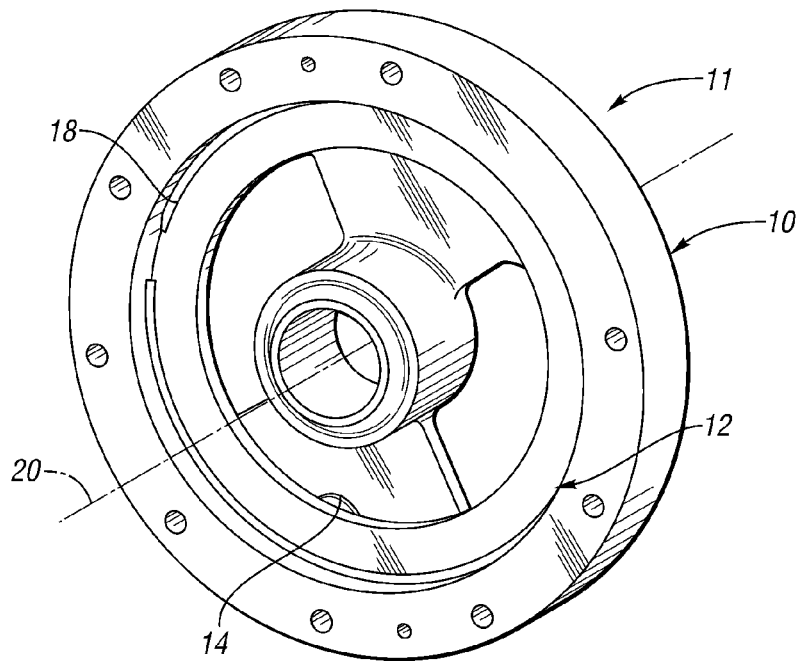
FIG. 1 is a front perspective view of an exemplary planar controllable or selectable one-way clutch or coupling assembly constructed in accordance with at least one embodiment of the invention.
Figure 2:
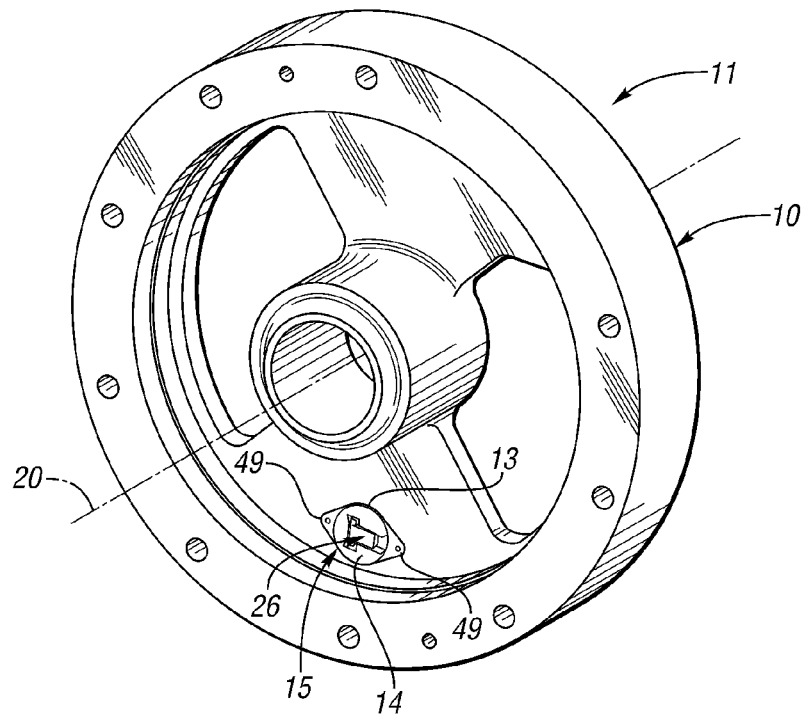
FIG. 2 is a front perspective view of the assembly of FIG. 1 with the notch plate and locking or snap ring removed to show the position of an electromechanical apparatus relative to a coupling member which supports the apparatus.
Figure 3:
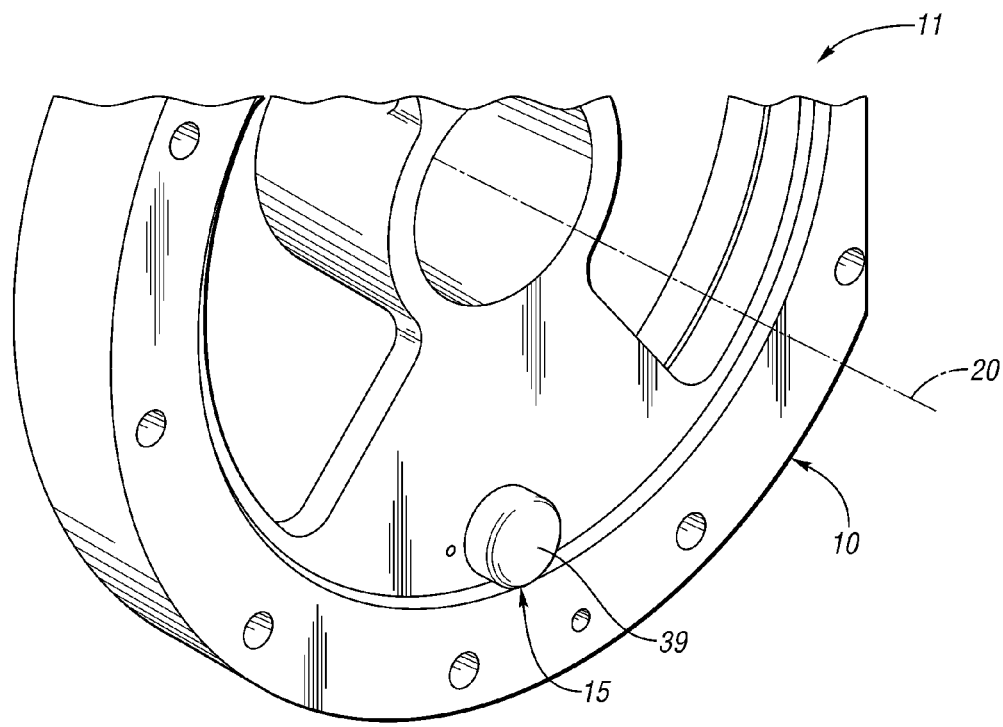
FIG. 3 is an enlarged back perspective view, partially broken away, of the coupling member and supported apparatus.
Figure 4:
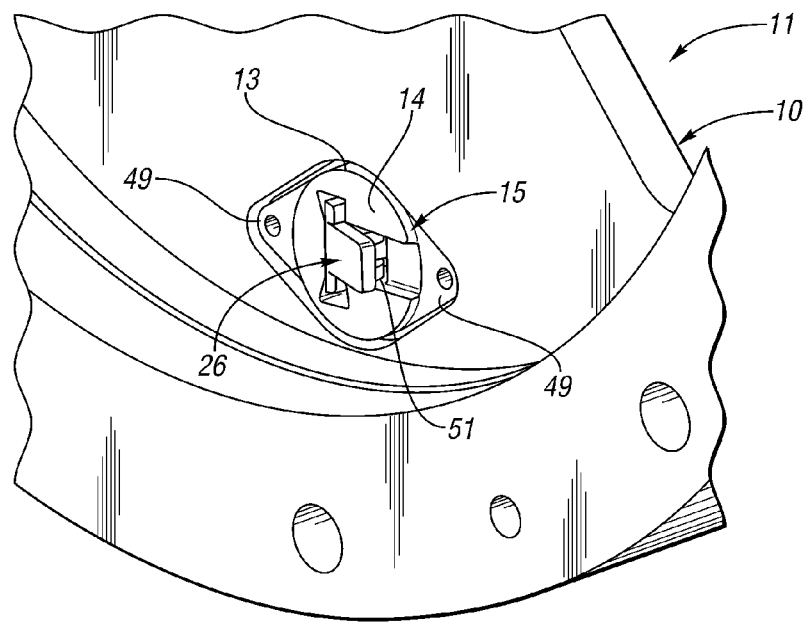
FIG. 4 is an enlarged front perspective view, partially broken away, of the coupling member and supported apparatus with its locking strut in a coupling position.
Figure 5:
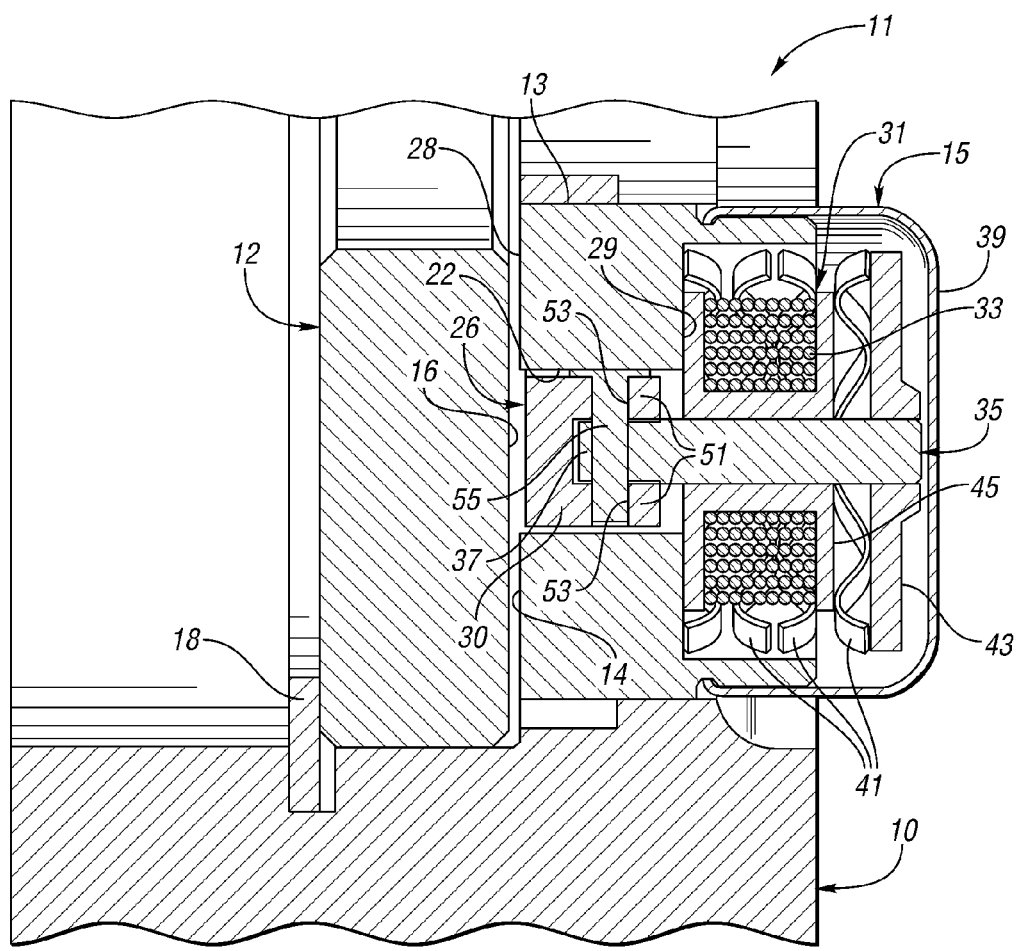
FIG. 5 is an enlarged side view, partially broken away and in cross section, of the assembly of FIG. 1 with the locking strut in its uncoupling position.

Referring now to FIGS. 1-5, there is illustrated a planar, controllable coupling assembly, generally indicated at 11. The assembly 11 includes a first coupling member, generally indicated at 10, a notch plate or member, generally indicated at 12, and an electromechanical apparatus, generally indicated at 15. The coupling assembly 11 may be a ratcheting, one-way clutch assembly. The second member 12 includes a second coupling face 16 in closed-spaced opposition with an outer coupling face 14 of a housing part 13 of the apparatus 15 when the members 10 and 12 are assembled and held together by a locking or snap ring 18 as shown in FIGS. 1 and 5. At least one of the members 10 and 12 is mounted for rotation about a common rotational axis 20.

Figure 6:
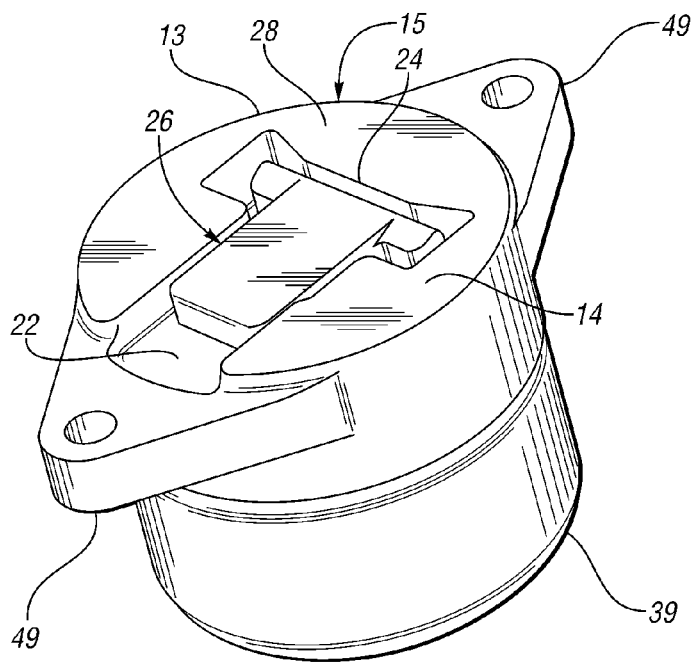
FIG. 6 is a top perspective view of the apparatus constructed in accordance with at least one embodiment of the present invention.
Figure 7:
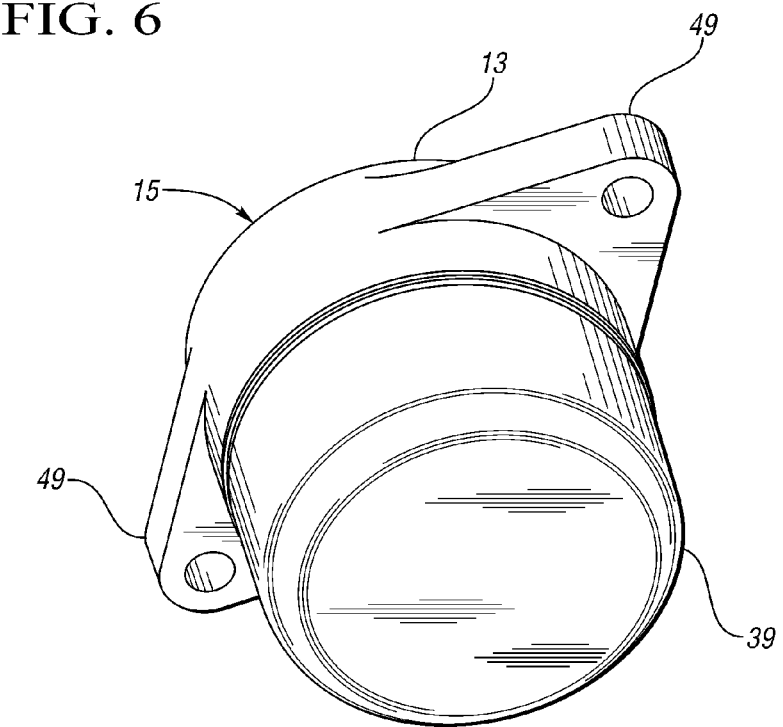
FIG. 7 is a bottom perspective view of the apparatus of FIG. 6.

The outer coupling face 14 of the housing part 13 has a single, T-shaped recess or pocket 22, as best shown in FIGS. 5 and 6. The recess 22 defines a load-bearing first shoulder 24. The second coupling face 16 of the notch plate 12 has a plurality of recesses or notches (not shown but well known in the art). Each notch of the notches defines a load-bearing second shoulder.

Referring to FIGS. 2, 4, 5, 6, 8 and 9, the electromechanical apparatus 15 may include a locking strut or element, generally included at 26, disposed between the coupling faces 14 and 16 of the housing part 13 and the member 12, respectively, when the members 10 and 12 are assembled and held together.

The element 26 may comprise a metal locking element or strut movable between first and second positions. The first position (FIGS. 4 and 9) is characterized by abutting engagement of the locking element 26 with a load-bearing shoulder (not shown) of the member 12 and the shoulder 24 of the pocket 22 formed in an end wall 28 of the housing part 13. The second position (FIGS. 2, 5, 6 and 8) is characterized by non-abutting engagement of the locking element 26 with a load-bearing shoulder of at least one of the member 12 and the end wall 28.

Figure 10:
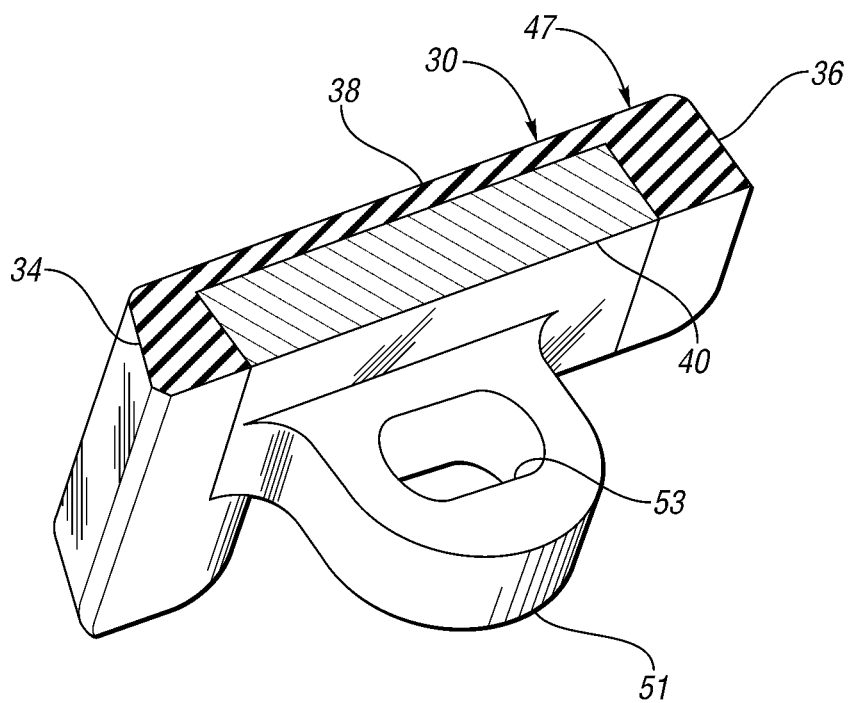
FIG. 10 is a bottom perspective sectional view of an impact energy storage element or strut constructed in accordance with at least one embodiment of the present invention.
Figure 11:
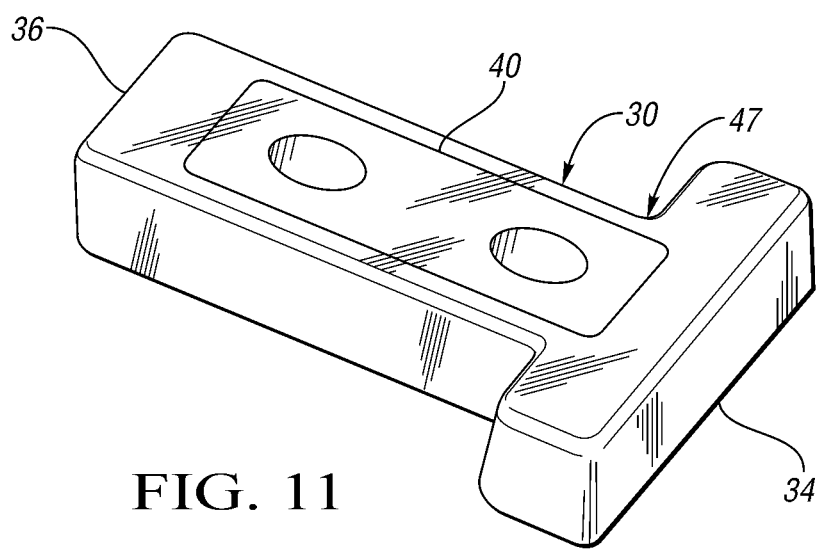
FIG. 11 is a top perspective view of the energy storage element or strut wherein projecting leg portions are not shown.
Figure 12:
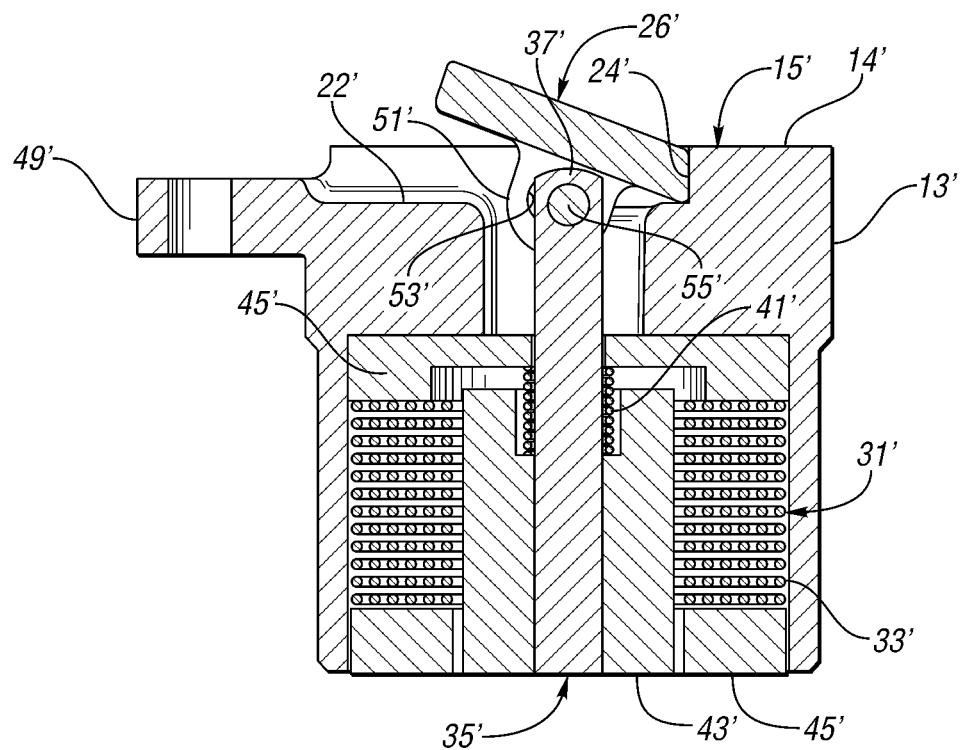
FIG. 12 is a side sectional view of an electromechanical apparatus constructed in accordance with a second embodiment of the present invention with its locking element in an extended coupling position.
Figure 13:
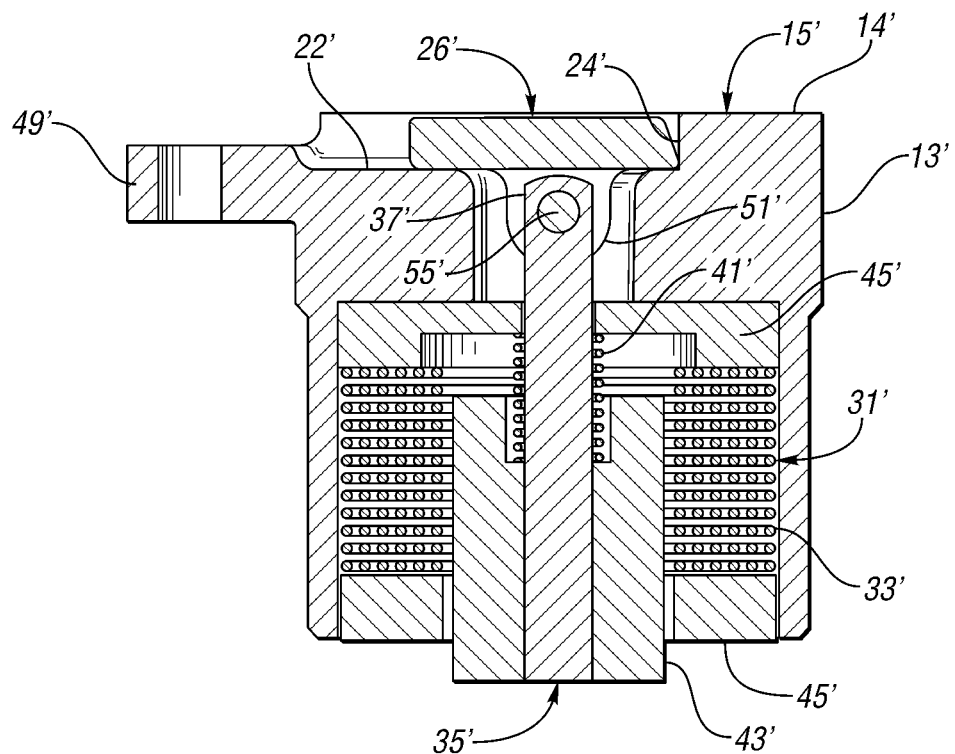
FIG. 13 is a view, similar to the view of FIG. 12, but with the locking element in its retracted, uncoupling position.
Figure 14:
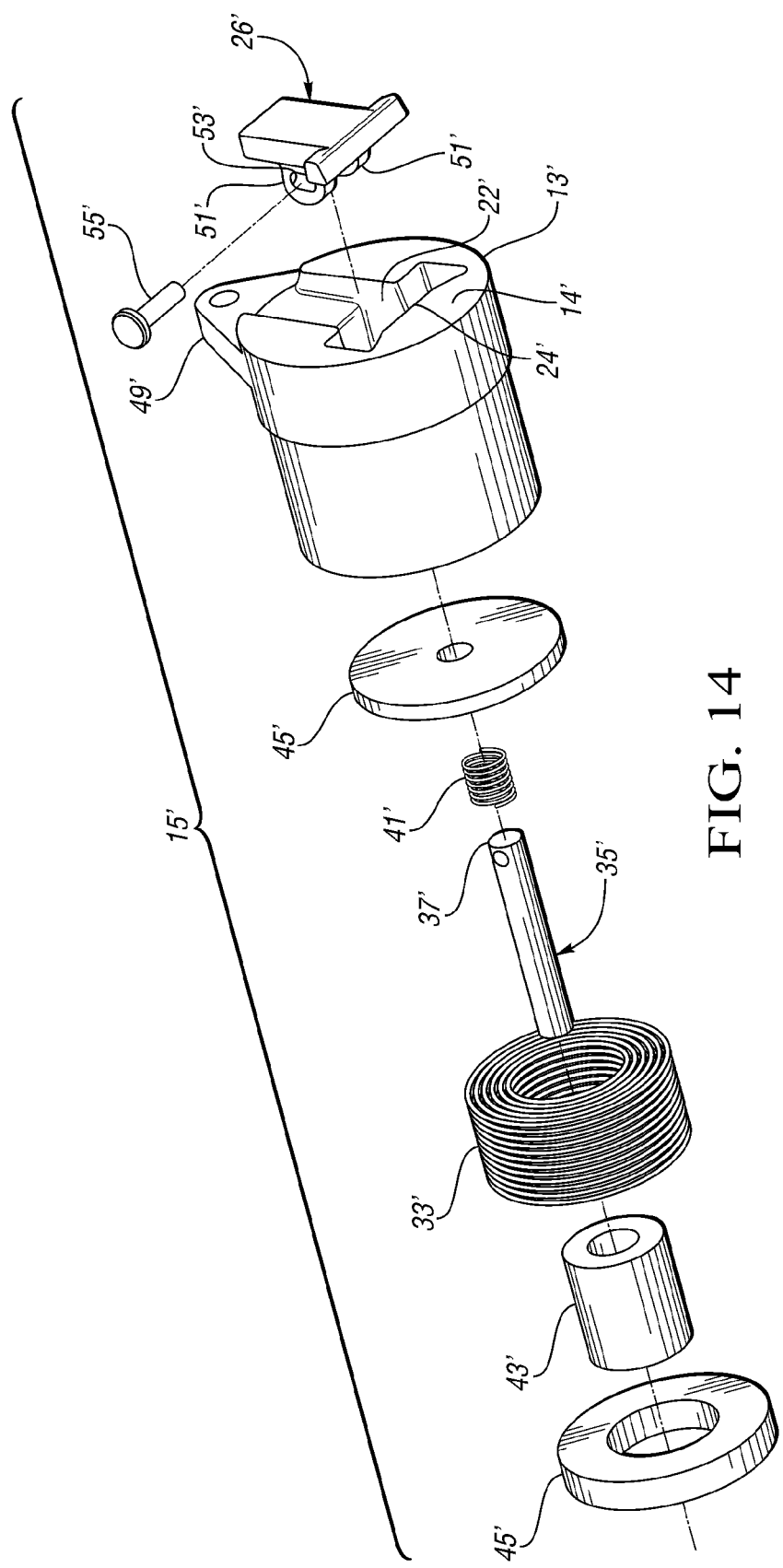
FIG. 14 is an exploded perspective top view of the apparatus of FIGS. 12 and 13.
Figure 15:
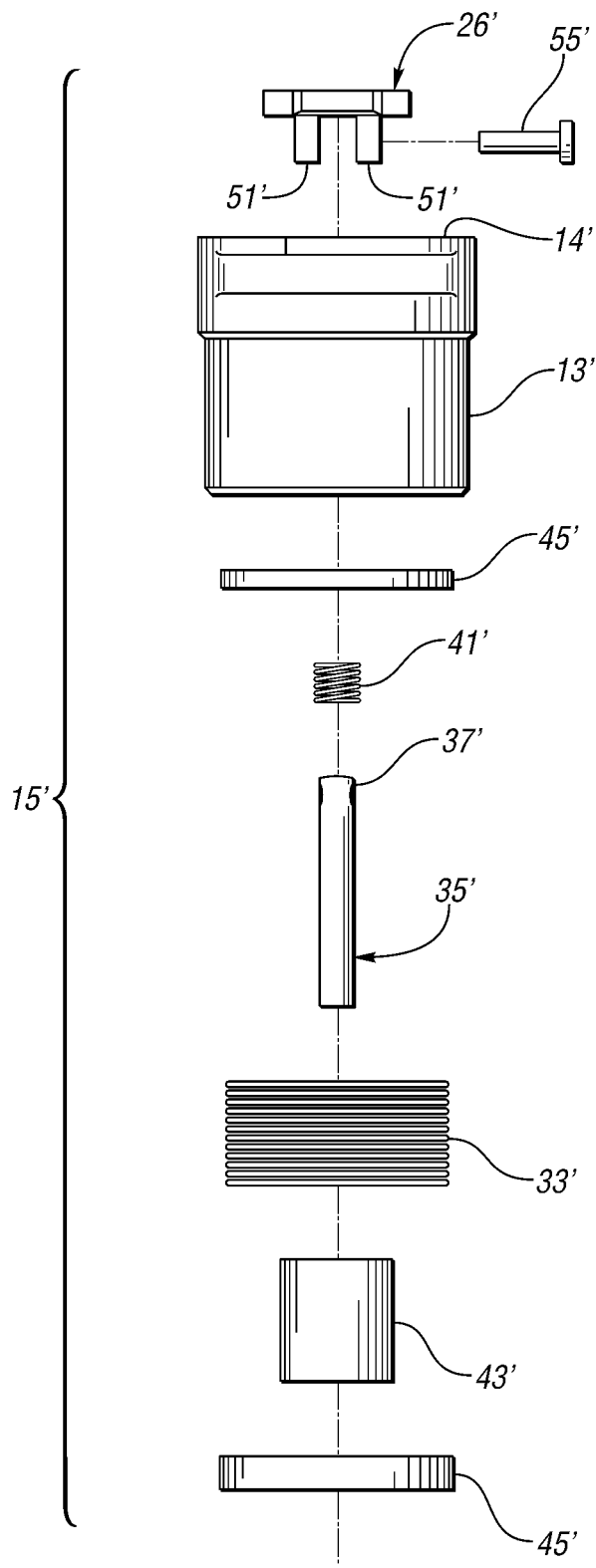
FIG. 15 is an exploded side view of the apparatus of FIGS. 12-14.

Alternatively, the apparatus 15 may include an impact energy storage element or synthetic rubber strut, generally indicated at 30 in FIGS. 10 and 11, to dampen the rotation between the members 10 and 12.

As previously mentioned and referring to FIGS. 5-9, the electromechanical apparatus 15 includes the housing part 13 which has a closed axial end including the end wall 28. The end wall 28 has the outer coupling face 14 with the single pocket 22 which defines the load-bearing shoulder 28 which is in communication with an inner face 29 of the end wall 28. The housing part 13 may be a powdered metal or aluminum (MIM) part.

Figure 8:
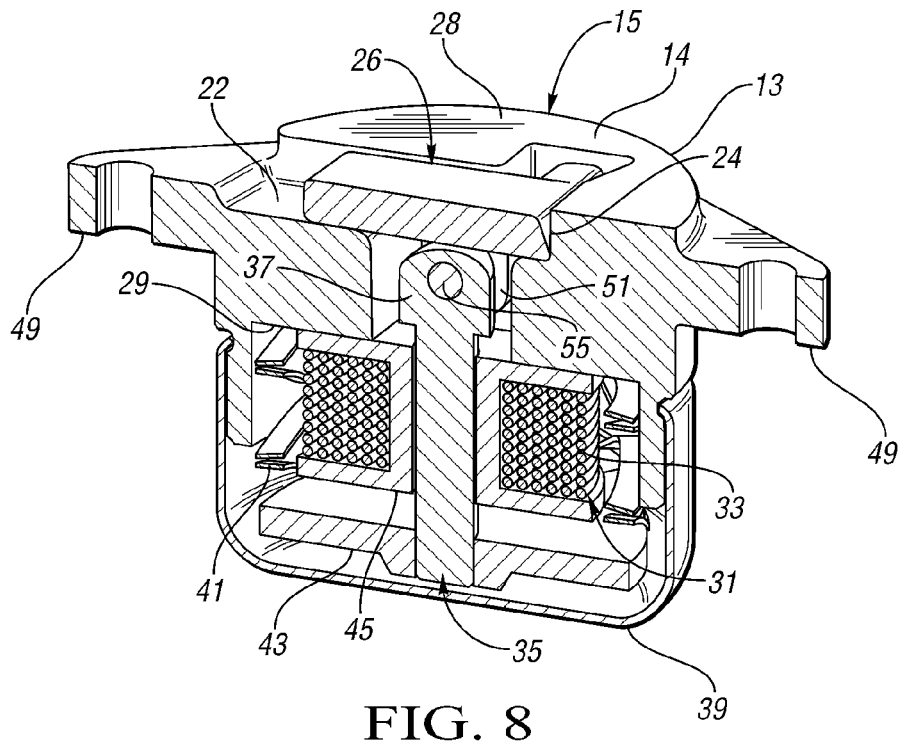
FIG. 8 is a side perspective sectional view of the apparatus of FIGS. 6 and 7 with the locking strut in its retracted uncoupling position.
Figure 9:
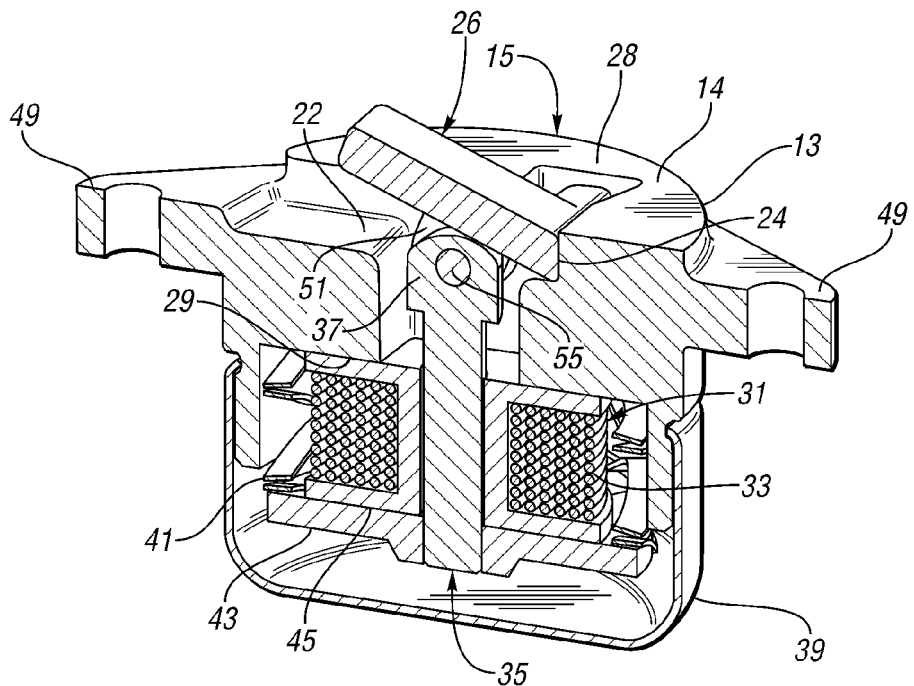
FIG. 9 is a view, similar to the view of FIG. 8, with the locking strut in its extended, coupling position.

Referring to FIGS. 5, 8 and 9, the apparatus 15 also includes an electromagnetic source, generally indicated at 31, including at least one excitation coil 33 which is at least partially surrounded by the housing part 15.

The element or strut 26 is shown in FIGS. 2, 5, 6 and 8 as being received within the pocket 22 in a refracted, uncoupling position. The strut 26 is movable outwardly from the pocket 22 to an extended, coupling position (FIGS. 4 and 9) characterized by abutting engagement of the strut 26 with a load-bearing shoulder of the notch plate 12.

The apparatus 15 also includes a reciprocating armature, generally indicated at 35, arranged concentrically relative to the at least one excitation coil 33 and is axially movable when the at least one excitation coil 33 is supplied with current. The armature 35 is connected at its leading end 37 to the element 26 to move the element 26 between its coupling and uncoupling positions.

When the element of the apparatus 15 is the rigid locking element 26, the element 26 controls the operating mode of the coupling assembly 11. When the element of the apparatus 15 is the impact energy storage element 30 of FIGS. 10 and 11, the element 30 absorbs and stores impact energy to reduce undesirable noise and contact stress caused by a transition between operating modes of the coupling assembly 11.

Whether the element or strut is a locking element or an energy storage element, the element 26 or 30 is pivotally connected to the leading end 37 of the armature 35 wherein the armature 35 pivotally moves the element 26 or 30 within the pocket 22 in response to reciprocating movement of the armature 35.

The apparatus 15 also preferably includes a return spring 41, a reaction plate 43 and a hollow tube 45 about which the coil 33 is wound and through which the armature moves. The spring 41 and the plate 43, which is secured to the opposite end of the armature 35, returns the armature 35 to its home position when the coil 33 is de-energized, thereby returning the element 26 or 30 to its uncoupling position. In other words, at least one return biasing member in the form of the return spring 41 urges the armature 35 through the plate 43 to a return position which corresponds to the uncoupling position of the element 30 or 26.

The housing may also include a stamped metal cup 39 which preferably has holes to allow oil to circulate within the housing. Preferably, the at least one coil 33, the housing part 13, the cup 39 and the armature 35 comprise a low profile solenoid. The locking element 26 may be a metal injection molded (i.e. MIM) strut.

Referring to FIGS. 10 and 11, the storage element 30 may include a rigid insert 40 and an elastomeric outer covering layer, generally included at 47, bonded to the insert 40. The outer covering layer 47 may be molded over the insert 40 in a thermoset injection molding process.

The storage element 30 carries high temperature-resistant elastomeric material defining opposite end sections 34 and 36 of the storage element 30. One of the end sections 34 is configured to deflect upon abutting engagement with the shoulder 24 and the other end section 36 deflects upon engagement with a shoulder of the notch plate 12.

The housing part 15 has at least one apertured attachment flange 49 and, preferably, two apertured attachment flanges 49 to attach the apparatus 15 to the coupling member 10 of the coupling assembly 11.

Each element, either 30 or 26, includes at least one and, preferably, two projecting leg portions 51 which provide an attachment location for the leading end 37 of the armature 35. Each leg portion 51 has an aperture 53. The apparatus 15 further comprises a pivot pin 55 received within each aperture 53 to allow rotational movement of the element 30 or 26 in response to reciprocating movement of the armature 35 wherein the leading end 37 of the armature 35 is connected to the element 30 or 26 via the pivot pin 55.

Preferably, each aperture 53 is an oblong aperture which receives the pivot pin 55 to allow both rotation and translational movement of the element 30 or 26 in response to reciprocating movement of the armature 35.

Each locking strut 26 may comprise any suitable rigid material such as metal, (i.e. steel). In accordance with at least one embodiment of the invention, each storage strut 30 (i.e. FIGS. 10 and 11) may comprise any suitable base polymer that displays rubber-like elasticity, such as an unsaturated or saturated rubber material including, but not limited to, a nitrile rubber such as a hydrogenated nitrile butadiene rubber (HNBR). The storage struts 30 are configured to dampen rotation and, consequently, engagement noise of the clutch assembly 11. For example, a portion or portions of each storage strut 30 such as the end portion 34 and 36 and/or middle portions 38 of each storage strut 30 may comprise one or more elastomeric materials, and the remainder of each storage strut 30 may comprise a metal, such as the metal steel insert 40.

Generally, each of the storage elements 30 carries resilient material defining the opposite end sections 34 and 36 of the storage element 30. Each storage element 30 is movable between coupling and uncoupling positions between the member 12 and the end wall 28 of the housing part 13. The coupling position is characterized by abutting engagement of the opposite end sections 34 and 36 with respective shoulders of the member 12 and the end wall 28. The uncoupling position is characterized by non-abutting engagement of one of its end sections 34 and 36 with at least one of the members 12 and the end wall 28. Each end section 34 or 36 is configured to deflect or compress upon abutting engagement with respective shoulders of the member 12 and the end wall 28.

In other words, each of the storage elements 30 may include the rigid insert 40 and the elastomeric outer covering layer 47 surrounding and bonded to the insert 40. The insert 40 may be a die-casting formed in a metal injection molding (MIM) process. The outer covering layer 47 is then molded over the insert 40. The molding may be a thermoset elastomer or a thermoplastic elastomer (TPE) which combines the rubber-like properties of a thermoset elastomer and the processing characteristics of a thermoplastic.

The above concept uses either a single metal or rigid strut 26 or synthetic rubber strut 30 with a metal insert 40. The material properties of the rubber are stable in hot transmission fluid or oil. A typical range of operating temperatures for the fluid or oil is −30° to 155° C.

A second embodiment of the electromechanical apparatus is generally indicated in FIGS. 12-15 at 15'. Each part of the apparatus 15' which is similar in form or function to the corresponding part of the apparatus 15 has the same reference number but a single prime designation.

While exemplary embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, the electromechanical apparatus 15 or 15' of the exemplary clutch assembly may be carried by a driving member of the clutch assembly or a driven member of the assembly. Moreover, the strut of the exemplary clutches assemblies may have any suitable configuration depending on whether the assembly is a planar coupling assembly as shown herein or a rocker coupling assembly (not shown). Also, each strut or rocker (in a radial coupling assembly) may have a middle portion that is thicker than each end portion of the strut or rocker.

The above noted designs may eliminate the need to keep backlash low which leads to lower stress (higher durability), which leads to lower cost race materials like Aluminum or FC208 PM.

Also, while a preferred base polymer is identified above as HNBR, other acceptable materials include but are not limited to fluoroelastomers, carboxylated nitrile butadiene rubber, nitrile butadiene rubber and ethylene acrylic rubber.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

What is claimed is:

1. An electromechanical apparatus for use in a controllable coupling assembly, the apparatus comprising:
    a housing part having a closed axial end including an end wall having an outer coupling face with a single pocket defining a load-bearing shoulder in communication with an inner face of the end wall;
    an electromagnetic source including at least one excitation coil at least partially surrounded by the housing part;
    an element received within the pocket in an uncoupling position and movable outwardly from the pocket to a coupling position characterized by abutting engagement of the element with the load-bearing shoulder; and
    a reciprocating armature arranged concentrically relative to the at least one excitation coil and being axially movable when the at least one excitation coil is supplied with current, the armature being connected to the element to move the element between the coupling and uncoupling positions wherein the element includes at least one projecting leg portion which provides an attachment location for a leading end of the armature and wherein each leg portion has an aperture and wherein the apparatus further comprises a pivot pin received within each aperture to allow rotational movement of the element in response to reciprocating movement of the armature and wherein the leading end of the armature is connected to the element via the pivot pin.

2. The apparatus as claimed in claim 1, wherein the element is a locking element which controls the operating mode of the coupling assembly.

3. The apparatus as claimed in claim 1, wherein the element is an impact energy storage element to absorb and store impact energy to reduce undesirable noise and contact stress caused by a transition between operating modes of the coupling assembly.

4. The apparatus as claimed in claim 1, wherein the element is pivotally connected to a leading end of the armature and wherein the armature pivotally moves the element within the pocket in response to reciprocating movement of the armature.

5. The apparatus as claimed in claim 1, wherein the at least one coil, the housing part and the armature comprise a low profile solenoid.

6. The apparatus as claimed in claim 2, wherein the locking element is an injection molded strut.

7. An electromechanical apparatus for use in a controllable coupling assembly, the apparatus comprising:
    a housing part having a closed axial end including an end wall having an outer coupling face with a single pocket defining a load-bearing shoulder in communication with an inner face of the end wall;
    an electromagnetic source including at least one excitation coil at least partially surrounded by the housing part;
    an element received within the pocket in an uncoupling position and movable outwardly from the pocket to a coupling position characterized by abutting engagement of the element with the load-bearing shoulder; and
    a reciprocating armature arranged concentrically relative to the at least one excitation coil and being axially movable when the at least one excitation coil is supplied with current, the armature being connected to the element to move the element between the coupling and uncoupling positions wherein the element is an impact energy storage element to absorb and store impact energy to reduce undesirable noise and contact stress caused by a transition between operating modes of the coupling assembly, wherein the storage element includes a rigid insert and an elastomeric outer covering layer surrounding and bonded to the insert.

8. The apparatus as claimed in claim 7, wherein the outer covering layer is a high temperature-resistant layer molded over the insert.

9. The apparatus as claimed in claim 3, wherein the storage element carries elastomeric material defining opposite end sections of the storage element, one of the end sections being configured to deflect upon abutting engagement with the shoulder.

10. The apparatus as claimed in claim 1, further comprising at least one return biasing member to urge the armature to a return position which corresponds to the uncoupling position of the element.

11. The apparatus as claimed in claim 1, wherein the housing part has at least one attachment flange to attach the apparatus to a coupling member of the coupling assembly.

12. The apparatus as claimed in claim 1, wherein the outer coupling face of the end wall is oriented to face axially.

13. The apparatus as claimed in claim 1, wherein the pocket has a T-shape.

14. The apparatus as claimed in claim 1, wherein each aperture is an oblong aperture to receive the pivot pin to allow both rotation and translational movement of the element in response to reciprocating movement of the armature.

15. A controllable coupling assembly having multiple operating modes, the assembly comprising:
    first and second coupling members supported for rotation relative to one another about a common rotational axis, the first coupling member having a first coupling face with a plurality of recesses, each of the recesses defining a load-bearing first shoulder; and
    an electromechanical apparatus attached to the second coupling member and including:
        a housing part having a closed axial end including an end wall having an outer coupling face in close-spaced opposition to the first coupling face and having a single pocket defining a load-bearing second shoulder in communication with an inner face of the end wall;
        an electromagnetic source including at least one excitation coil at least partially surrounded by the housing part;
        an element received within the pocket in an uncoupling position and movable outwardly from the pocket to a coupling position to couple the coupling members together, the coupling position being characterized by abutting engagement of the element with respective shoulders of the first member and the end wall; and
        a reciprocating armature arranged concentrically relative to the at least one excitation coil and being axially movable when the at least one excitation coil is supplied with current, the armature being connected to the element to move the element between the coupling and uncoupling positions.

16. The assembly as claimed in claim 15, wherein the element is a locking element.

17. The assembly as claimed in claim 15, wherein the element is an impact energy storage element to absorb and store impact energy.

18. The assembly as claimed in claim 15, wherein the element is pivotally connected to a leading end of the armature and wherein the armature pivotally moves the element within the pocket in response to reciprocating movement of the armature.

19. The assembly as claimed in claim 16, wherein the locking element is an injection molded strut.

20. The assembly as claimed in claim 17, wherein the storage element includes a rigid insert and an elastomeric outer covering layer surrounding and bonded to the insert.

21. The assembly as claimed in claim 20, wherein the outer covering layer is a high temperature-resistant layer molded over the insert.

22. The assembly as claimed in claim 17, wherein the storage element carries elastomeric material defining opposite end sections of the storage element, each end section being configured to deflect upon abutting engagement with respective shoulders of the first coupling member and the end wall.

23. The assembly as claimed in claim 15, wherein the at least one coil, the housing part and the armature comprise a low profile solenoid.

24. The assembly as claimed in claim 15, further comprising at least one return biasing member to urge the armature to a return position which corresponds to the uncoupling position of the element.

25. The assembly as claimed in claim 15, wherein the housing part has at least one attachment flange to attach the apparatus to the second coupling member.

26. The assembly as claimed in claim 15, wherein the outer coupling face of the end wall is oriented to face axially.

27. The assembly as claimed in claim 15, wherein the pocket has a T-shape.

28. The assembly as claimed in claim 15, wherein the element includes at least one projecting leg portion which provides an attachment location for a leading end of the armature.

29. The assembly as claimed in claim 28, wherein each leg portion has an aperture and wherein the apparatus further includes a pivot pin received within each aperture to allow rotational movement of the element in the pocket in response to reciprocating movement of the armature and wherein the leading end of the armature is connected to the element via the pivot pin.

30. The assembly as claimed in claim 29, wherein each aperture is an oblong aperture to receive the pivot pin to allow both rotation and translational movement of the element in response to reciprocating movement of the armature.

31. A controllable coupling assembly having multiple operating modes, the assembly comprising:
    first and second coupling members supported for rotation relative to one another about a common rotational axis, the first coupling member having a first coupling face with a plurality of recesses, each of the recesses defining a load-bearing first shoulder; and
    an electromechanical apparatus including:
        a housing part having a closed axial end including an end wall having an outer coupling face in close-spaced opposition to the first coupling face and having a single pocket defining a load-bearing second shoulder in communication with an inner face of the end wall;
        an electromagnetic source including at least one excitation coil at least partially surrounded by the housing part;
        an element received within the pocket in an uncoupling position and movable outwardly from the pocket to a coupling position characterized by abutting engagement of the element with respective shoulders of the first member and the end wall; and
        a reciprocating armature arranged concentrically relative to the at least one excitation coil and being axially movable when the at least one excitation coil is supplied with current, the armature being connected to the element to move the element between the coupling and uncoupling positions.

\* \* \* \* \*